US012488894B2

(12) United States Patent
Goergen et al.

(10) Patent No.: US 12,488,894 B2
(45) Date of Patent: Dec. 2, 2025

(54) SYSTEM AND METHODS FOR MACHINE LEARNING DRIVEN CONTOURING CARDIAC ULTRASOUND DATA

(71) Applicant: Purdue Research Foundation, West Lafayette, IN (US)

(72) Inventors: Craig Jonathan Goergen, West Lafayette, IN (US); Frederick William Damen, West Lafayette, IN (US); Guang Lin, West Lafayette, IN (US); David Taylor Newton, Superior, CO (US)

(73) Assignee: Purdue Research Foundation, West Lafayette, IN (US)

( * ) Notice: Subject to any disclaimer, the term of this patent is extended or adjusted under 35 U.S.C. 154(b) by 48 days.

(21) Appl. No.: 17/561,178

(22) Filed: Dec. 23, 2021

(65) Prior Publication Data

US 2022/0367048 A1  Nov. 17, 2022

Related U.S. Application Data

(60) Provisional application No. 63/141,414, filed on Jan. 25, 2021, provisional application No. 63/130,514, filed on Dec. 24, 2020.

(51) Int. Cl.
*G16H 50/20* (2018.01)
*G16H 30/20* (2018.01)

(52) U.S. Cl.
CPC ............. *G16H 50/20* (2018.01); *G16H 30/20* (2018.01)

(58) Field of Classification Search
None
See application file for complete search history.

(56) References Cited

U.S. PATENT DOCUMENTS 6,757,423 B1 * 6/2004 Amini ..................... G06T 7/246
382/128
11,200,738 B2   12/2021 Goergen et al.
(Continued)

FOREIGN PATENT DOCUMENTS

| AU | 2012322014 A1 * | 4/2014 | ............ G06T 7/246 |
| JP | 3902765 B2 * | 4/2007 | ............ G06K 9/48 |
| WO | WO-0048509 A1 * | 8/2000 | ............ G06T 7/246 |

OTHER PUBLICATIONS

Chen, C. et al., "Deep Learning for Cardiac Image Segmentation: a Review," Frontiers in Cardiovascular Medicine, vol. 7, Article 25, (2020), doi:10.3389/fcvm.2020.00025.

(Continued)

*Primary Examiner* — Lena Najarian
(74) *Attorney, Agent, or Firm* — Purdue Research Foundation

(57) ABSTRACT

A system and methods for machine learning driven contouring of cardiac ultrasound data is provided. A system may receive cardiac imaging data generated by an ultrasound device directed at a left ventricle of a heart. The imaging data may include a time dimension and a plurality of spatial dimensions. The system may align the image data with an axis that passes through an apex and base of the left ventricle. The system may predict, based on a machine learning model and the imaging data, locations of a plurality of anchor points over a cardiac cycle. The system may output the predicted locations of the anchor points.

16 Claims, 5 Drawing Sheets

(56) References Cited

U.S. PATENT DOCUMENTS

| | | | | |
|---|---|---|---|---|
| 2003/0153823 | A1* | 8/2003 | Geiser | G06T 7/0012 |
| | | | | 600/407 |
| 2004/0153128 | A1* | 8/2004 | Suresh | G16H 30/20 |
| | | | | 600/407 |
| 2008/0137929 | A1* | 6/2008 | Chen | G06T 17/20 |
| | | | | 382/131 |
| 2010/0195881 | A1* | 8/2010 | Orderud | G06T 7/277 |
| | | | | 382/131 |
| 2012/0101368 | A1* | 4/2012 | Masumoto | A61B 6/503 |
| | | | | 600/420 |
| 2012/0121152 | A1* | 5/2012 | Lu | G06V 30/19173 |
| | | | | 382/131 |
| 2021/0304463 | A1* | 9/2021 | Rufli | G06N 3/08 |

OTHER PUBLICATIONS

Leclerc, S. et al., "Deep Learning for Segmentation Using an Open Large-Scale Dataset in 2D Echocardiography," IEEE Transactions on Medical Imaging, vol. 38, No. 9, 2198-2210 (Sep. 2019), doi: 10.1109/TMI.2019.2900516.

Liu, S. et al., "Deep Learning in Medical Ultrasound Analysis: a Review," Engineering, vol. 5, No. 2, 261-275, (2019) paper received 2018, doi:10.1016/j.eng.2018.11.020.

Wang, Z., "Deep Learning in Medical Ultrasound Image Segmentation: a Review," arXiv.org, (2021).

Brattain, L. J. et al., "Machine learning for medical ultrasound: status, methods, and future opportunities," Abdominal Radiology (NY), vol. 43, No. 4, pp. 786-799, (2018), doi: 10.1007/s00261-018-1517-0.

Akkus, Z. et al., "A Survey of Deep-Learning Applications in Ultrasound: Artificial Intelligence-Powered Ultrasound for Improving Clinical Workflow," J Am Coll Radiol, vol. 16, No. 9 , pp. 1318-1328 (2019), doi: 10.1016/j.jacr.2019.06.004.

Dormer, J., et al., "Ultrasound Segmentation of Rat Hearts Using Convolution Neural Networks," Proceedings of SPIE Medical Imaging 2018: Ulrasonic Imaging and Tomography, vol. 10580, No. 105801A-1, (2018), doi: 10.1117/12.2293558.

Dey, D. et al., "Artificial Intelligence in Cardiovascular Imaging: JACC State-of-the-Art Review," J Am Coll Cardiol, vol. 73, No. 11, 1317-1335, (Mar. 26, 2019; j.jacc 2018), doi: 10.1016/j.jacc.2018.12.054.

Wang, Y. et al., "Fully automatic segmentation of 4D MRI for cardiac functional measurements," Med Phys, vol. 46, No. 1, 180-189, (Jan. 2019), doi: 10.1002/mp.13245.

Berhane, H. et al., "Fully automated 3D aortic segmentation of 4D flow MRI for hemodynamic analysis using deep earning," Magnetic Resonance in Medicine, vol. 84, No. 4, 2204-2218, (2020), paper received 2019, doi: 10.1002/mrm.28257.

\* cited by examiner

SYSTEM AND METHODS FOR MACHINE LEARNING DRIVEN CONTOURING CARDIAC ULTRASOUND DATA

This application claims the benefit of U.S. Provisional Application No. 63/130,514 filed Dec. 24, 2020 and U.S. Provisional Application No. 63/141,414 filed Jan. 25, 2021, the entirety of each of these applications is hereby incorporated by reference.

TECHNICAL FIELD

This disclosure relates to medical imaging and, in particular, to cardiovascular medical imaging.

BACKGROUND

As heart disease remains the number one cause of death in the United States, echocardiography remains an integral tool to the proper diagnosis and prognosis of abnormal cardiac function. Furthermore, the development of murine models of cardiac disease have provided researchers a strong foundation to further our understanding of pathological hallmarks and how specific genetic and/or environmental factors might drive progression. To bridge the gap between imaging technology and murine disease models, high-frequency ultrasound uses MHz frequency ultrasonic waves to acquire images of small structures (e.g. mouse left ventricle with a thickness of ~1 mm) that are rapidly moving (e.g. mouse heart rate is ~500-600 bpm), thus too difficult to be adequately viewed using clinical ultrasound systems. Recent advancements in high-frequency ultrasound technologies have also introduced a collection of four-dimensional ultrasound (4DUS) approaches, allowing for more thorough analyses of cardiac motion beyond global metrics based on idealized geometries (i.e., ejection fraction, stroke volume), similar to that commonly reported with clinical cine-magnetic resonance imaging (cine-MRI).

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In tandem with the advancement of ultrasound imaging technology, integrations of machine learning and artificial intelligence algorithms—particularly deep neural nets—have shown promise in rapidly and robustly characterizing cardiac kinematics and ultrasound data in general. While machine learning has been used to aid contouring in planar echocardiography, applications to four-dimensional ultrasound (4DUS) data remains limited. 4DUS data presents unique challenges, including low image contrast in combination with large amounts of speckle noise. Additionally, 4D image data in general suffers from high dimensionality and relatively small sample sizes for model training.

Accordingly, there is disclosed digital systems and methods for contouring of high-frequency cardiac ultrasound data. By way of introductory example, the system access cardiac imaging data generated by an ultrasound device directed at a left ventricle of a heart. The imaging data may include a time dimension and a plurality of spatial dimensions. The system may align the image data with an axis that passes through an apex and base of the left ventricle. The system may predict, based on a machine learning model and the imaging data, locations of a plurality of anchor points over a cardiac cycle. The system may output the predicted locations of the anchor points.

As described herein, a machine learning model may be trained and implemented to contour imaging data acquired from healthy and diseased (i.e. hypertrophic cardiomyopathy) subjects. While various examples of the model is described in detail below, in one example, the model may have the following design considerations: 1) a low dimensional representation of the raw imaging data (also referred to as 4DUS data), 2) a basis expansion of time to incorporate the regularity in epicardial movement throughout the cardiac cycle, and 3) the assumption that the model need only predict output values at preselected anchor points using interpolating cubic splines to form the final output structure.

Figure 1:
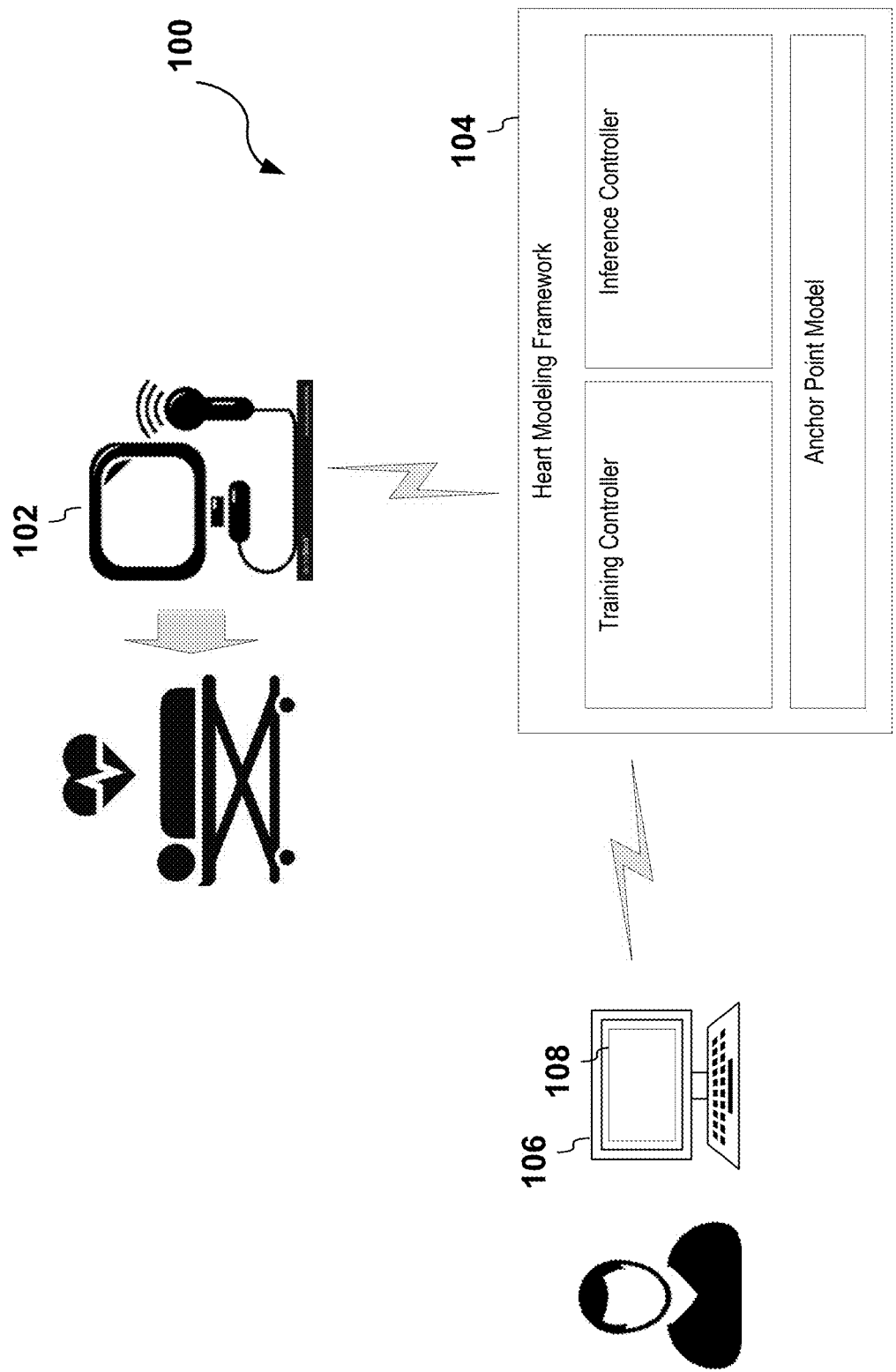
FIG. 1 illustrates a first example of a system.

FIG. 1 illustrates a first example of a system 100. The system may include an imaging device 102 suited for diagnostic imaging. The imaging device 102 may include, for example, a device that generates imagery with ultrasound, magnetic resonance imaging, and/or computed tomography. The imaging device 102 may generate the imaging data. The imaging data may include a matrix of intensity values where each intensity value is mapped to a physical location in space (x, y, z). In some examples, the imaging data may be four-dimensional with three spatial dimensions and a temporal dimension (t). As described herein, spatiotemporal ultrasound data is referred to as 4-dimension ultrasound data (4DUS).

In various experimentation involving aspects of the embodiments described herein, mice subjects, imaging was performed using a Vevo3100 high-frequency ultrasound system (FUJIFILM VisualSonics Inc.) with a 40 MHz center frequency transducer (MX550D) and a translating linear step motor. In preparation for imaging, mice were anesthetized using approximately 1.5-2.0% isoflurane, secured supine on a heated stage with gold-plated electrodes that collected cardiac and respiratory signals, and had hair removed from the ventral surface via a depilatory cream. Each 4DUS dataset was acquired by translating through short-axis slices from below the apex of the heart to above aortic arch. A total of 136 4DUS datasets were used to implement the machine learning algorithm, taken from previous studies on genetically-induced cardiac hypertrophy. One effort focused on a mutation of $Nkx2\text{-}5^{183P/+}$, having 24 mutant and 24 littermate-control 4DUS datasets. The second focused on a mutation of $CPT2^{M-/-}$, including mutant and 47 littermate-control 4DUS datasets. While each of these studies have longitudinal data acquired from each mouse at different points across their lifespan, for the scope of this work, each 4DUS scan was treated as independent data. All animal experiments were approved by the Purdue University Institutional Animal Care and Use Committee (protocol code 121100077326; approved Dec. 11, 2015).

The system 100 may include a heart modeling framework 104. The heart modeling framework may include, or access, an anchor point model. The anchor point model may include a machine learning model trained to predict anchor points on heart boundary locations, such as the endocardial and epicardial boundaries of a left ventricle, over a cardiac cycle.

The system may further include a controller to facilitate training of the anchor point model. The system may further include an inference controller to facilitate pre-processing of the 4DUS data for predicting the anchor points. The training controller may load 4DUS data from one or more hearts and allow display and interaction with images rendered based on the 4DUS data.

Figure 2:
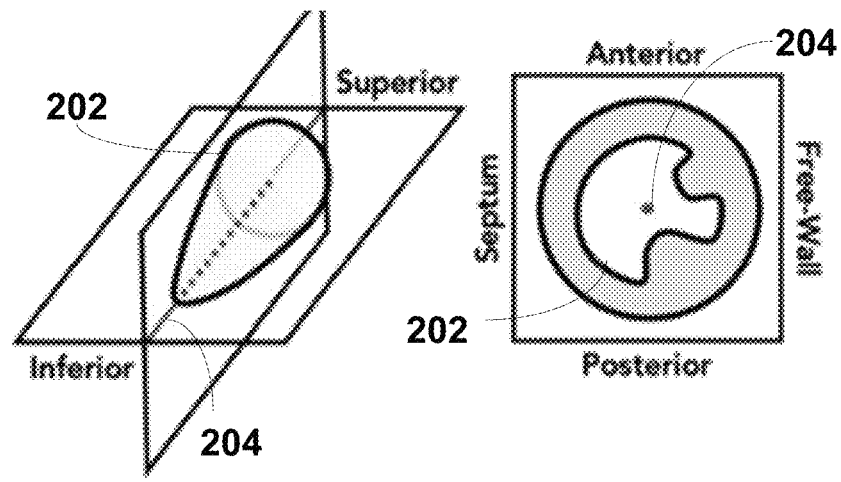
FIG. 2 illustrates spatial reorientation to align a displayed left ventricle with a central z-axis.
Figure 3:
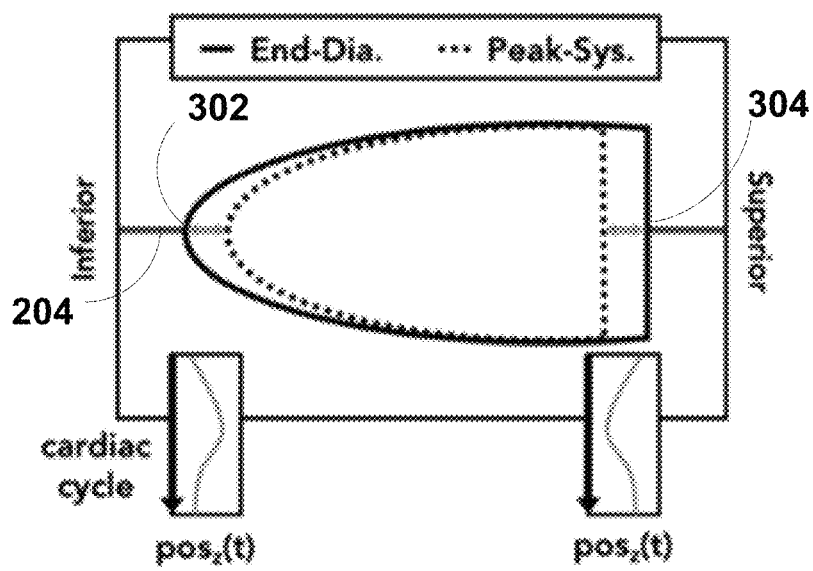
FIG. 3 illustrates tracking of apex and base locations on a displayed left ventricle.

FIG. 2-4 illustrate user interfaces for post-acquisition analysis on left-ventricular 4DUS data. FIG. 2 illustrates spatial reorientation to align a displayed left ventricle 202 with a central z-axis 204. The z axis 204 and/or displayed left ventricle 202 may be translated on the screen such that the z-axes 204 extends centrally along the left ventricle 202 between inferior and superior walls. A user or automated process may first reorient the image to align to a standard axis and then the endo- and epicardial boundaries may be manually tracked across a representative cardiac cycle. The standard axes follow a coordinate system, such as a cartesian coordinate system. The Z axis 204 may extend along the left-ventricular apex and center of the base. The anterior and posterior walls fall along the y-axis. The septal wall may falls on the negative x-axis (i.e. standard radiological orientation).

After the translation is complete, the translation data may be saved. Alternatively or in addition, the 4D Ultrasound data may be transformed based on the translation(s).

FIG. 3 illustrates tracking of apex and base locations on the displayed left ventricle. Following reorientation, the z-axis location of the apex 302 and base 304 are tracked across the cardiac cycle. Then iteratively at each point in time, parallel short-axis slices (shown in FIG. 4) are interpolated from the reoriented 4DUS data. In some examples, the slices may be equally spaced at 25, 50, 75, and 100% of the distance from the apex to base, though other distance combinations are possible. The initial tracking of base and apex locations allows for through-plane motion to be compensated for during subsequent wall-tracking. Alternatively, or in addition, the cardiac cycle may be tracked according to processes described in U.S. patent application Ser. No. 16/903,039 which is hereby incorporated by reference.

Figure 4C:
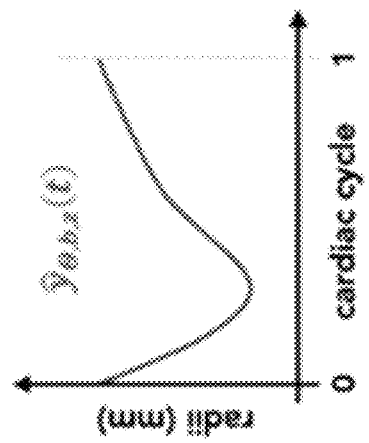
FIG. 4A-C illustrates definition of slices and anchor points on endo- and epi-cardial boundaries tracked across a cardiac cycle.
Figure 4B:
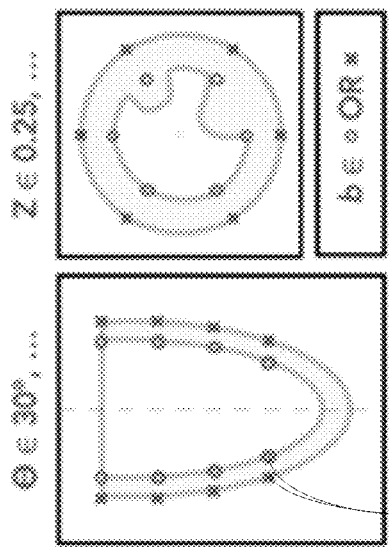
Figure 4A:
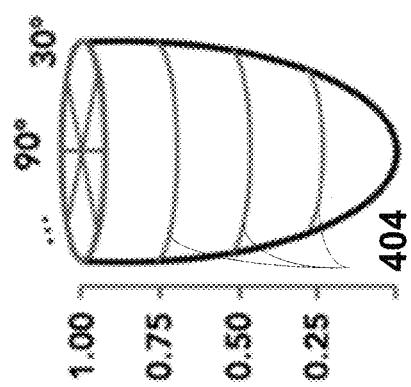

FIG. 4 illustrates definition of slices 404 and anchor points 406 on the endo- and epi-cardial boundaries to be tracked across the cardiac cycle. FIG. 4A illustrates an example of the slices 404 at locations equally spaced at 25, 50, 75, and 100% of the distance from the apex to base. Anchor points may be formed on the epicardial and/or endocardial bounders along each slice. The locations of indexed anchor points be referred to a mesh. A mesh may include anchor points of the endocardial and/or epicardial boundaries of the left ventricle over one or more time value of a cardiac cycle. As illustrated in FIG. 4B, the anchor points of a mesh may include a structured subset of points such that: 1) each of four parallel slices contains six points for each of the two boundaries, 2) those points are constrained to equally spaced rotations around the central z-axis (i.e. 30, 90, 150, 210, 270, and 330 degrees relative to the positive x-axis), and 3) the distance between each point and the central z-axis is a function of relative time across the cardiac cycle. Alternatively or in addition, the anchor points may be indexed based on slice identifier, boundary identifier, angle relative to the z-axis, time in the cardiac cycle, image frame, or a combination thereof.

For various times or frames along the cardiac cycle, the anchor points may be moved and/or adjusted either manually or automatically. Once all points are individually positioned across the cardiac cycle to define the regional kinematics, hobby splines may be used to interpolate a three-dimensional mesh of the left-ventricle at a standardized array of cycle-positions. In various experimentations, the final mesh of the left-ventricle included locations around the z-axis, 60 locations from the apex-to-base along the z-axis, and 60 time-points across the cardiac cycle. It should be appreciated that the number of slices, rotations, and, ultimately, anchor points for each time may be varied depending on the implementation.

FIG. 4C illustrates how any given anchor point may be expected to move, with regards to change in radius from the Z axis, across any given cardiac cycle. The exact curvature may vary based on which slide, rotation, and border is being analyzed.

Figure 5:
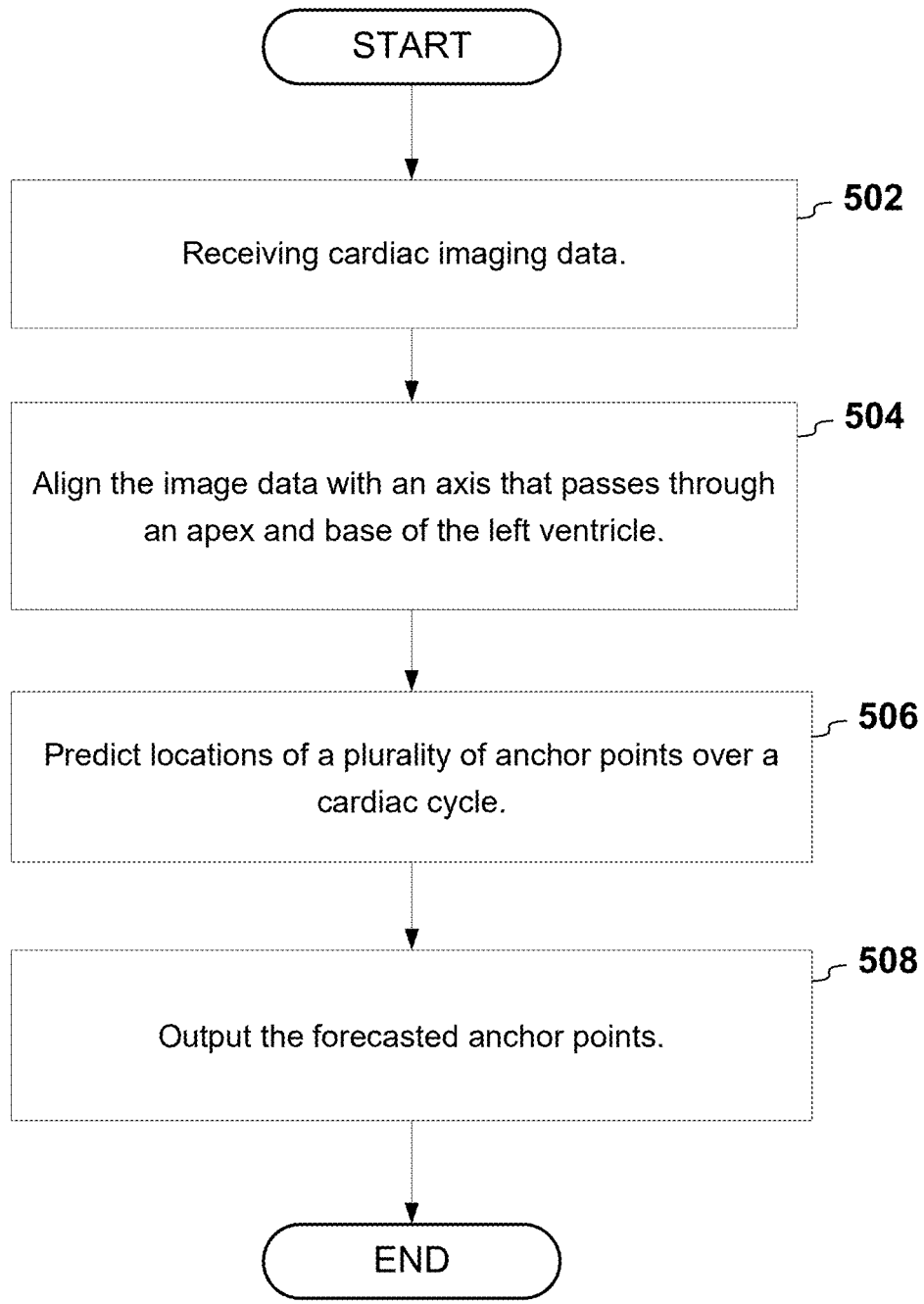
FIG. 5 illustrates example logic for this system.
Figure 6:
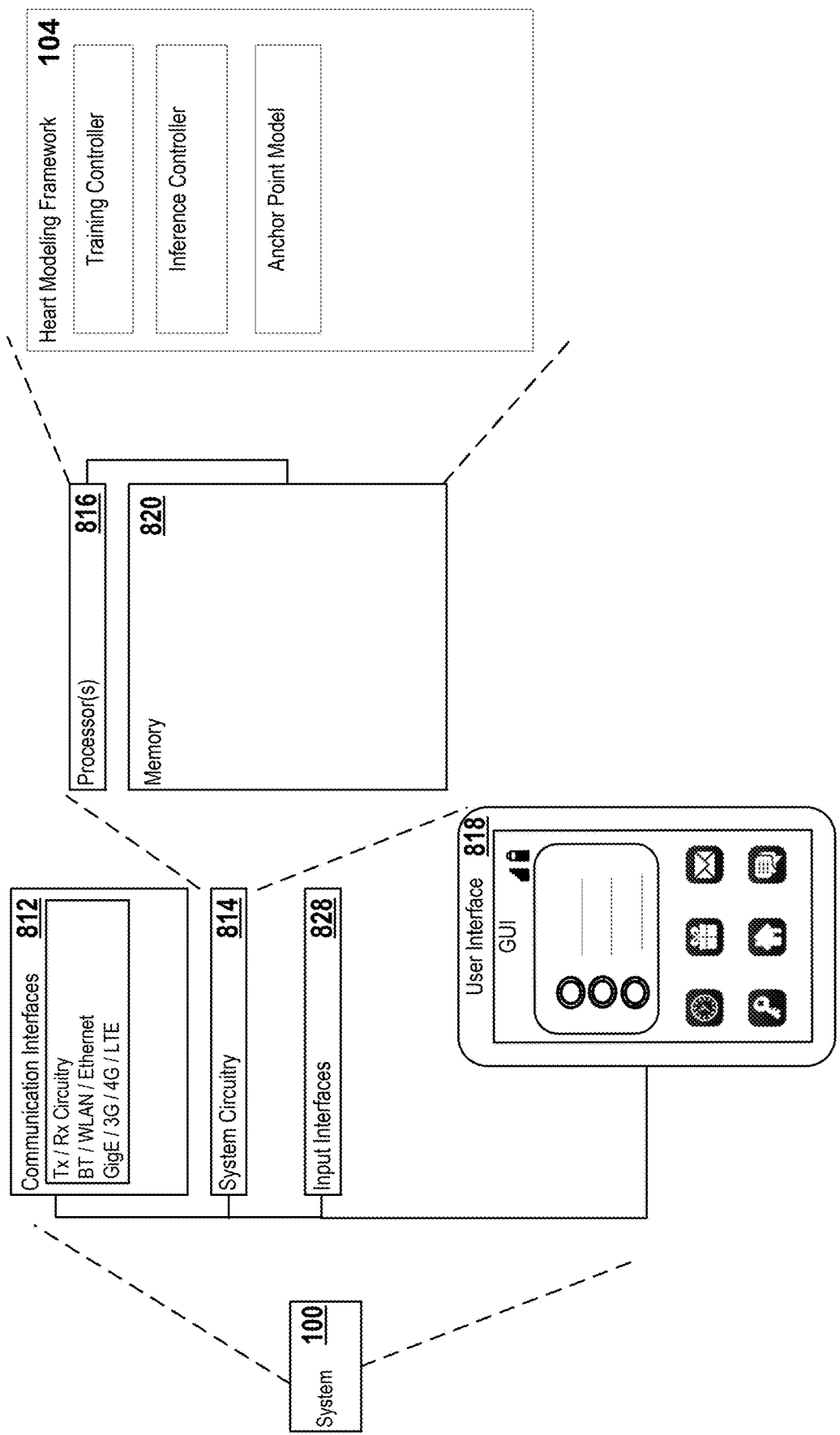
FIG. 6 illustrates a second example of a system.

FIG. 5 illustrates example logic for this system 100. During inference time, the system may receive cardiac imaging data (502). For example, the imaging data may be generated by an ultrasound machine directed to a heart. In some examples, the ultrasound data may be accessed from a data store and/or received from the imaging device.

The system may align the image data with an axis (i.e. the z-axis in FIG. 2) that passes through an apex and base of the left ventricle. (504). For example, an image data may be displayed as a graphic on the terminal device 106 illustrated in FIG. 1. The terminal device 106 may receive user input that causes the graphic to move in one or more virtual dimensions. In some examples, an axis may be displayed on the terminal device and the image may be moved such that the axis centrally passes through the base and apex of the heart. The movement of the image may cause the image data to be re-oriented. The translation in the X, Y, and Z directions defined on the screen may be applied to the 4DUS data.

The system may predict locations of a plurality of anchor points over a cardiac cycle (506). For example, the system may access the anchor point model and predict one or more 3D surfaces (i.e. one for the endocardial boundary, one for the epicardial boundary) across multiple timepoints. The nature of the task immediately presents several technical challenges: the data is high dimensional (160,000 pixels per image with about 5,000 total images), US data naturally contains speckle noise, and the model output includes two smooth 3D surfaces across time with no specified parametric form. The data processing approach described herein reduces the problem complexity while still allowing for flexible contours to be estimated. Predicting radial distances of each anchor point becomes a regression problem, with the complete contours being inferred using smoothing splines after the anchor points have been estimated. To manage the high dimensionality of the image data, the image processor may perform principal component analysis (PCA) to project the US images onto a lower dimensional subspace.

The machine learning model may include one or more weights, or matrix of weights, that are modified during training to provide a best-fit. Since anchor points have fairly regular movement patterns, smoothing splines may capture the average path for each anchor point across time. The model may incorporate both the rotated, compressed image data along with a smoothing spline basis. The following is an example of a machine learning model.

$$\hat{y}_{\theta,b,z}(t) = W_{k,z}\beta_{\theta,b,z} + \Phi(t)\gamma_{\theta,b,z} \quad \text{(Equation 1)}$$

where $\hat{y}_{\theta,b,z}$ indicates the predicted response vector of radii for the anchor point indexed by the given angle, boundary, and horizontal slice respectively. $W_{k,z}$ represents the pixel image data for image slice z, which has been compressed using the first k principal components, thus only retaining the most influential imaging information when making predictions. OW represents the time-dependent smoothing spline basis, and $\beta_{\theta,b,z}$ and $\gamma_{\theta,b,z}$ represent the parameter vectors to be fit for each (θ,b,z) combination. The model may be fit using least squares.

Additional or alternative model variations are also possible. For example, a second model (Eq. 2) uses principal components from all z slices combined for each anchor point, instead of only using the horizontal slice of the target anchor point:

$$\hat{y}_{\theta,b,z}(t) = W_\kappa \beta_{\theta,b,z} + |\Phi(t)\gamma_{\theta,b,z} \quad \text{(Equation 2)}$$

where $W_\kappa$ represents the pixel image data concatenated from the individual z slices. This may provide benefit by incorporating imaging data from across volume when making predictions at any given z-slice.

A third model (Eq. 3) simulates a scenario where the machine 147 learning model is human-assisted:

$$\hat{y}_{\theta,b,z}(t) = W_\kappa \beta_{\theta,b,z} + |\Phi(t)\gamma_{\theta,b,z} + \delta\mu_{\theta_0,b_0,z_0} \quad \text{(Equation 3)}$$

where $\mu_{\theta_0,b_0,z_0}$ is the true radius for the given anchor point, and δ is a single additional scalar parameter to be fit. In this case, the model compensates for an annotation input by a user for a single anchor point. Thus, the model has access to the true target response value for one of the roughly 1500 anchor points to be predicted for a given spatiotemporal location.

The system may output the predicted anchor points (508). For example, the system may provide a mesh, or multiple meshes, of anchor points over one or more time instances in a cardiac cycle. The mesh(es) may be used to render an image or animation of the left ventricle based on the predicted anchor points.

The logic illustrated in the flow diagrams may include additional, different, or fewer operations than illustrated. The operations illustrated may be performed in an order different than illustrated.

The system 100 may be implemented with additional, different, or fewer components than illustrated. Each component may include additional, different, or fewer components. For example, the system may or may not include the terminal device and/or the imaging device.

FIG. 4 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the training controller, the inference controller, the anchor point model, the heart modeling framework 104, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the training controller, the inference controller, the anchor point model, the heart modeling framework 104, and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the training controller, the inference controller, the anchor point model, the heart modeling framework 104, or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations. The appendix includes additional and alternative examples and experimental results according to various aspects described herein.

What is claimed is:

1. A method, comprising:
receiving four-dimensional ultrasound image data generated by an ultrasound device directed at a left ventricle of a heart, the image data comprising a time dimension and a plurality of spatial dimensions;
aligning the image data with an axis that passes through an apex and base of the left ventricle;
generating, by a processor, based on a machine learning model and the four-dimensional image data, a mesh for rendering an epicardial and an endocardial boundary of the heart at various times along a cardiac cycle, the mesh comprising displayable locations of a plurality of anchor points along the endocardial boundary and the epicardial boundary of the heart over the cardiac cycle by:
accessing a first parameter vector corresponding to the anchor points, respectively;
weighting at least a portion of the four-dimensional image data with the first parameter vector;

generating smoothing spline values associated with a plurality of times in the cardiac cycle;

accessing a second parameter vector corresponding to the anchor points; and weighting the smoothing spline values with the second parameter vector;

generating, based on the weighted four-dimensional image data and the weighted smoothing spline values, a plurality of response vectors, each of the response vectors corresponding to a separate one of the anchor points; and forecasting, based on the response vectors, the locations of the anchor points at one or more times during the cardiac cycle; and displaying, by the processor, a graphical user interface including the image data and the anchor points rendered from the mesh, wherein the anchor points are positioned on the displayed image data at the displayable locations along the endocardial boundary and epicardial boundary of the heart, wherein at least one of the anchor points are selectively moveable in the graphical user interface and the mesh is updated in response to movement of the at least one of the anchor points.

2. The method of claim 1, further comprising:
obtaining an annotated location for at least one of the anchor points;
generating predicted groups of anchor points based on the weighted image data, the weighted smoothing spline values, and the annotated location for the at least one of the anchor points.

3. The method of claim 2, where obtaining the annotated location for the at least one of the anchor points comprises displaying the image data;
receiving an input operation directed at the displayed image data; and
generating the annotated location in response to the input operation.

4. The method of claim 1, wherein aligning the image data further comprises:
displaying the image data and a line corresponding to the axis; and
receiving an input operation corresponding to the image data, reorienting the image data in response to the input operation.

5. The method of claim 1, further comprising:
render an animation of the left ventricle of the heart based on the locations of the anchor points over the cardiac cycle.

6. The method of claim 1, wherein each of the anchor points are uniquely mapped to a corresponding combination of index parameters, the index parameters including:
an identifier of a cross sectional plane perpendicular to the axis,
a predetermined angle with respect to the axis; and
a boundary type identifier corresponding to at least one of the epicardial boundary and the endocardial boundary.

7. The method of claim 1, wherein the anchor points include a first group of anchor points corresponding to the epicardial boundary of the heart and a second group of anchor points corresponding to the endocardial boundary of the heart.

8. The method of claim 1, further comprising:
communicating the anchor points over a network, storing the anchor points in a memory, or a combination thereof.

9. A system comprising:
a hardware processor, the hardware processor configured to
receive four-dimensional image data generated by an ultrasound device directed at a left ventricle of a heart, the image data comprising a time dimension and a plurality of spatial dimensions;
align the image data with an axis that passes through an apex and base of the left ventricle;
generate, based on a machine learning model and the four-dimensional image data, a mesh for rendering an epicardial and an endocardial boundary of the heart at various times along a cardiac cycle, the mesh comprising locations of a plurality of anchor points along the endocardial boundary and the epicardial boundary of the heart over the cardiac cycle, wherein to generate the locations of the plurality of anchor points over the cardiac cycle, the hardware processor is configured to:
access a first parameter vector corresponding to the anchor points, respectively;
weight at least a portion of the four-dimensional image data with the first parameter vector;
generate smoothing spline values associated with a plurality of times in the cardiac cycle;
access a second parameter vector corresponding to the anchor points; and
weight the smoothing spline values with the second parameter vector;
generate, based on the weighted four-dimensional image data and the weighted smoothing spline values, a plurality of response vectors, each of the response vectors corresponding to a separate one of the anchor points; and
forecast, based on the response vectors, the locations of the anchor points at one or more times during the cardiac cycle; and
display, by the processor, a graphical user interface including the image data and the anchor points, wherein the anchor points are positioned on the displayed image data at the locations along the endocardial boundary and epicardial boundary of the heart,
wherein at least one of the anchor points are selectively moveable in the graphical user interface and the mesh is updated in response to movement of the at least one of the anchor points.

10. The system of claim 9, wherein the processor is further configured to:
obtain an annotated location for at least one of the anchor points;
generate predicted groups of anchor points based on the weighted image data, the weighted smoothing spline values, and the annotated location for the at least one of the anchor points.

11. The system of claim 10, where to obtain the annotated location for the at least one of the anchor points, the processor is further configured to:
display the image data;
receive an input operation directed at the displayed image data; and
generate the annotated location in response to the input operation.

12. The system of claim 9, wherein to align the image data, the processor is further configured to:
display the image data and a line corresponding to the axis; and receive an input operation corresponding to the image data, reorientate the image data in response to the input operation.

13. The system of claim 9, wherein the processor is further configured to:

render an animation of the left ventricle of the heart based on the locations of the anchor points over the cardiac cycle.

14. The system of claim 9, wherein each of the anchor points are uniquely mapped to a corresponding combination of index parameters, the index parameters including:

an identifier of a cross sectional plane perpendicular to the axis, a predetermined angle with respect to the axis; and a boundary type identifier corresponding to at least one of the epicardial boundary and the endocardial boundary.

15. The system of claim 9, wherein the anchor points include a first group of anchor points corresponding to the epicardial boundary of the heart and a second group of anchor points corresponding to the endocardial boundary of the heart.

16. The system of claim 9, wherein the processor is further configured to: communicate the anchor points over a network, store the anchor points in a memory, or a combination thereof.

* * * * *